Figure 1:
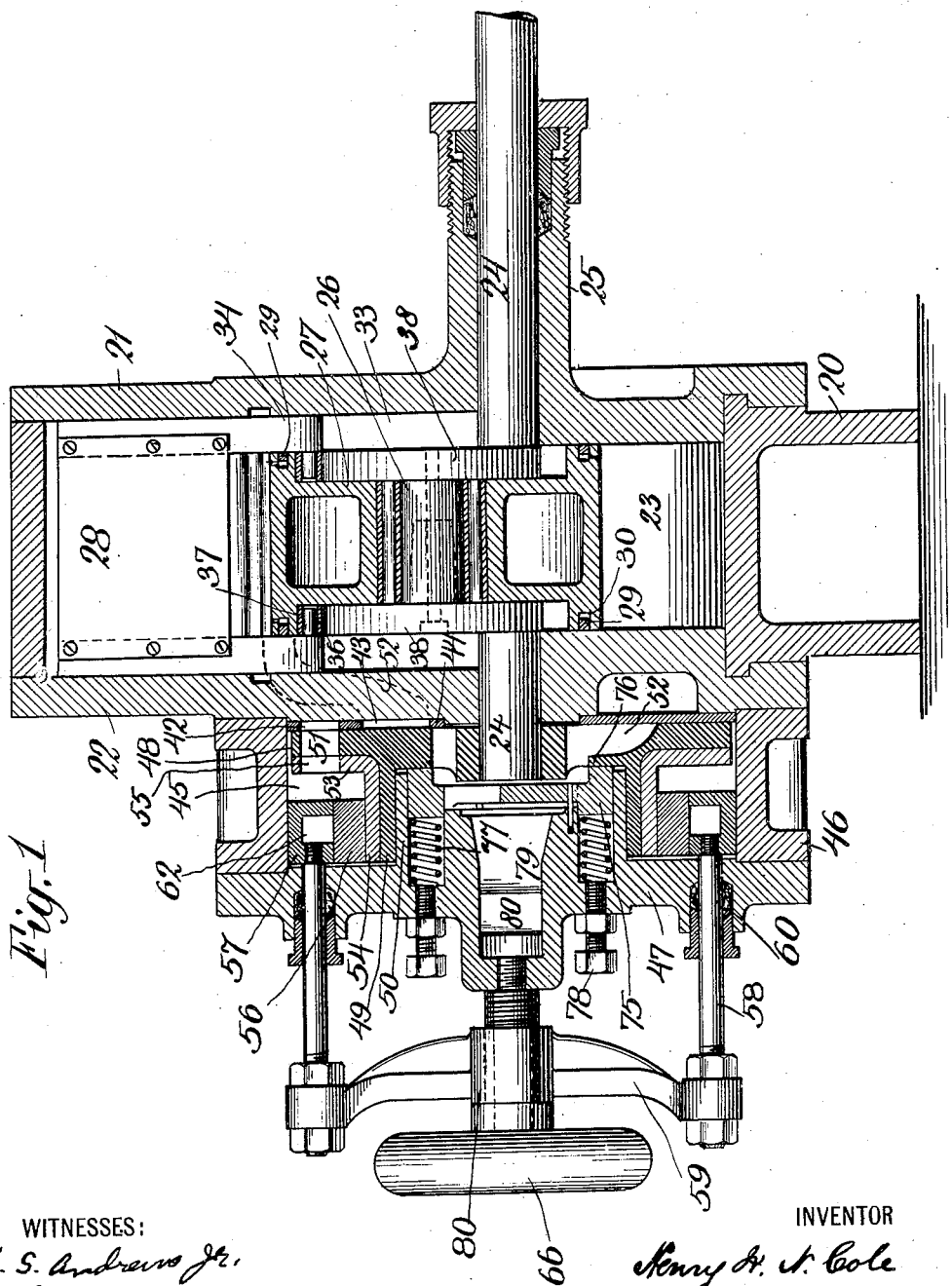

H. W. N. COLE.
ROTARY ENGINE.
APPLICATION FILED FEB. 12, 1908.

902,473.

Patented Oct. 27, 1908.

6 SHEETS—SHEET 1.

WITNESSES:

INVENTOR

Henry H. N. Cole

BY his ATTORNEYS

H. W. N. COLE.
ROTARY ENGINE.
APPLICATION FILED FEB. 12, 1908.
902,473.
Patented Oct. 27, 1908.
6 SHEETS—SHEET 2.
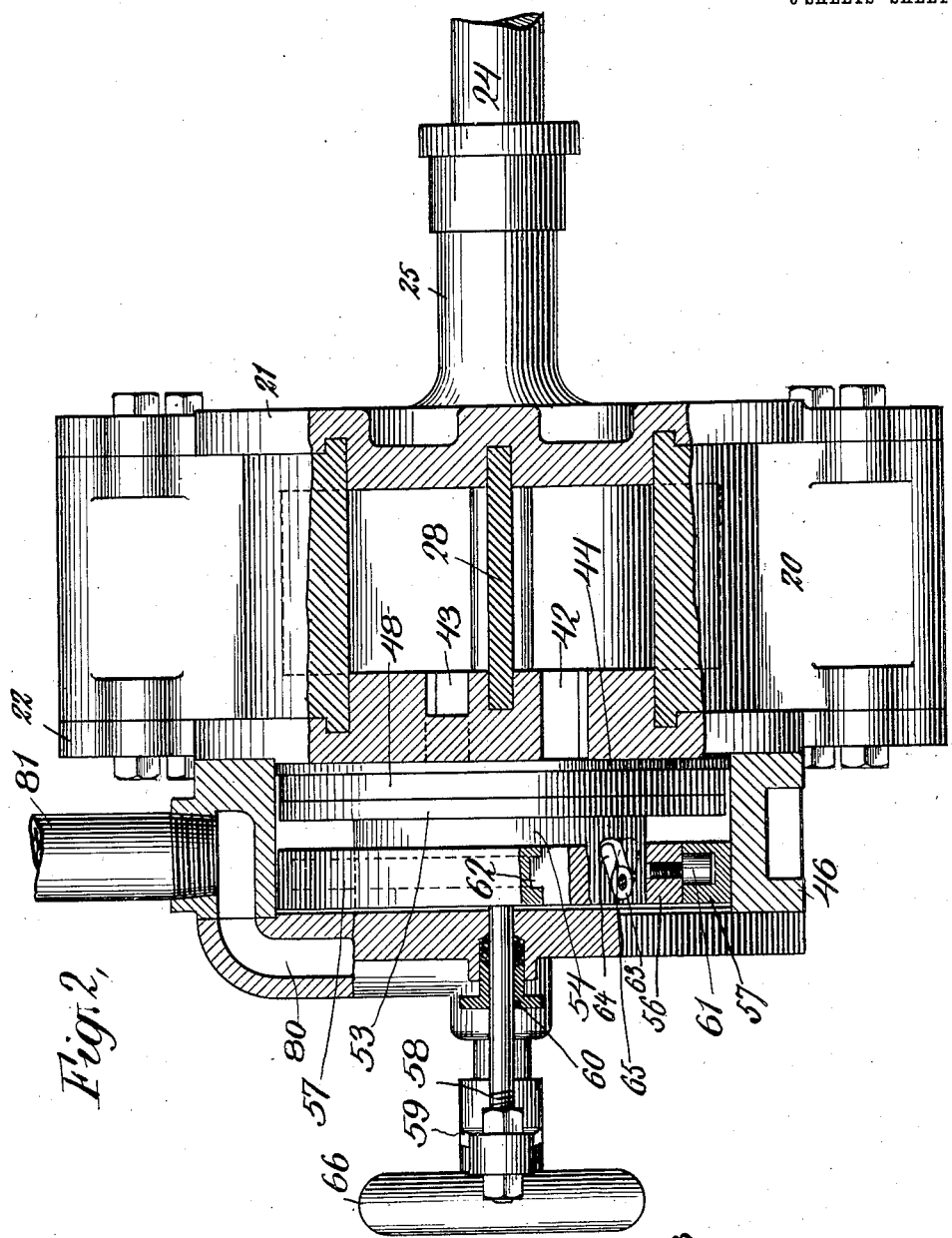
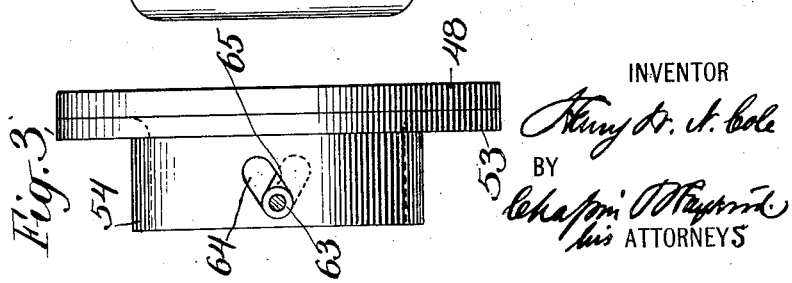
WITNESSES:
INVENTOR
ATTORNEYS

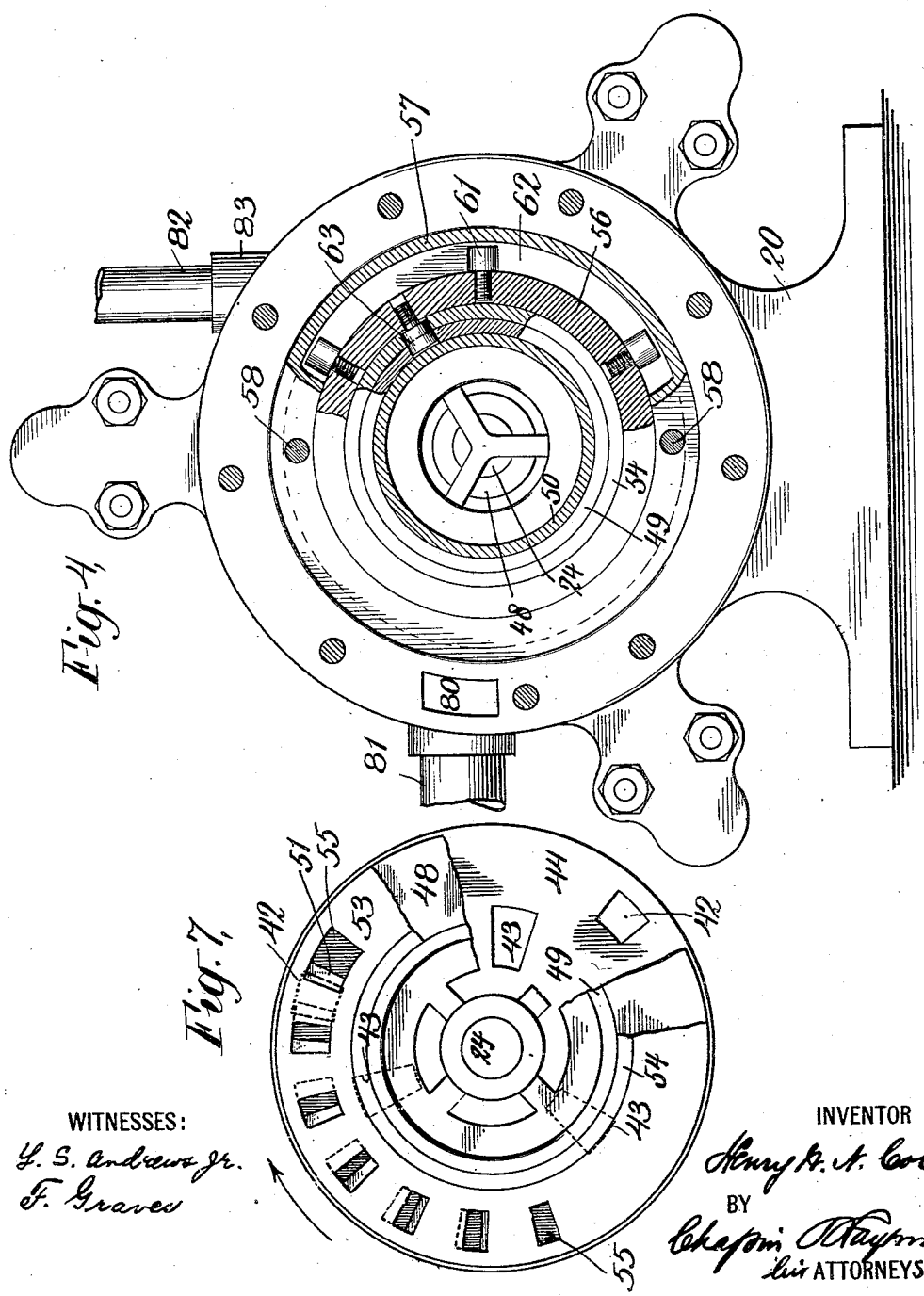

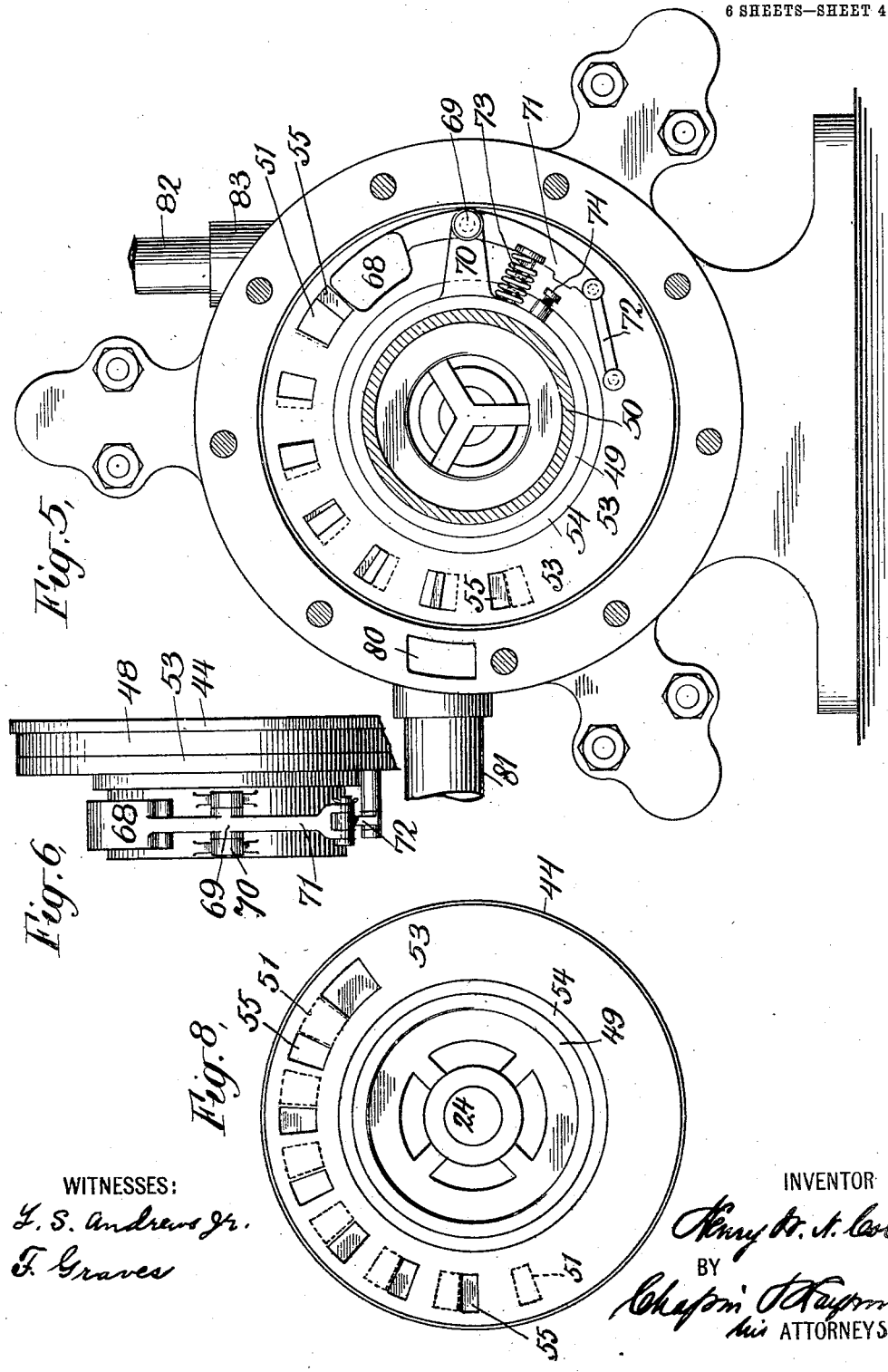

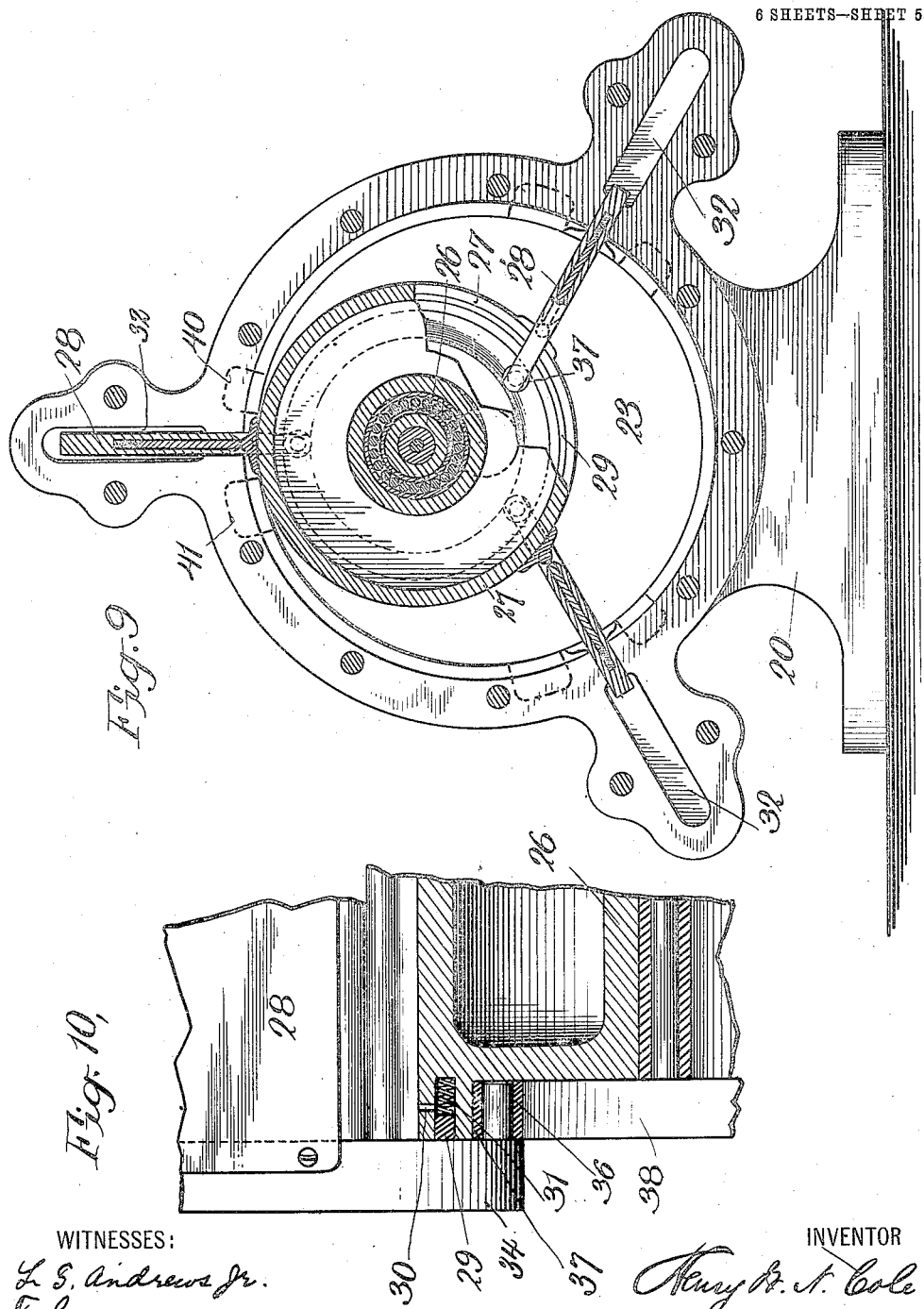

H. W. N. COLE.
ROTARY ENGINE.
APPLICATION FILED FEB. 12, 1908.
902,473.
Patented Oct. 27, 1908.
6 SHEETS—SHEET 6.
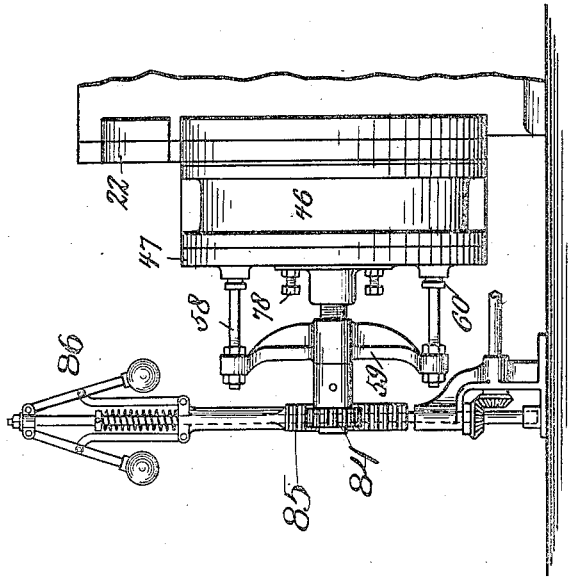
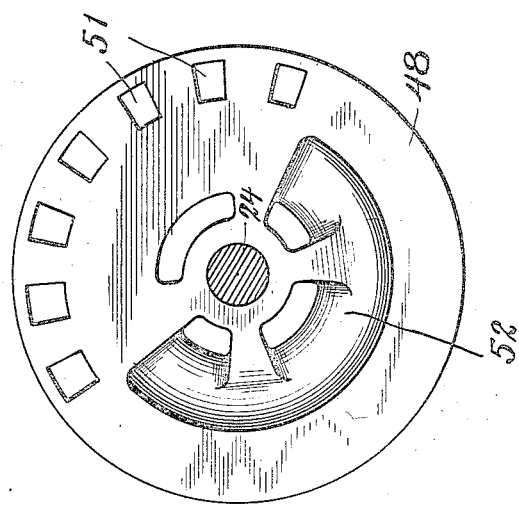
WITNESSES:
INVENTOR

UNITED STATES PATENT OFFICE.

HENRY W. N. COLE, OF BROOKLYN, NEW YORK.

ROTARY ENGINE.

No. 902,473.    Specification of Letters Patent.    Patented Oct. 27, 1908.

Application filed February 12, 1908. Serial No. 415,564.

*To all whom it may concern:*

Be it known that I, HENRY W. N. COLE, a citizen of the United States of America, and a resident of Brooklyn, county of Kings, State of New York, have invented certain new and useful Improvements in Rotary Engines, of which the following is a specification, reference being had to the accompanying drawings, forming a part thereof.
My invention relates to improvements in rotary engines and particularly to that type of rotary engine which comprises a cylinder or casing, a crank shaft journaled therein, a rotary piston freely mounted upon the crank portion of the shaft within the said cylinder, and sliding abutments which divide the steam space within the cylinder into several chambers.

My invention consists, first, in an improved means for operating the said sliding abutments; second, in an improved valve mechanism comprising a combined inlet and exhaust valve mounted upon the main shaft in a chamber to one side of the central steam space, the said combined valve being common to the several chambers into which the steam space is divided; third, in an improved means in connection with the valve for controlling the period of admission, said means including a rider for the valve, and a device for changing the position of the rider with respect to the valve, fourth, in an improved form and construction of automatic governor for the said controlling means, and lastly, in various novel features of construction and combination of parts as will hereinafter be fully pointed out.

The objects of my invention are, first, to reduce the wear caused by friction upon the operating means for the sliding abutments, and between the sliding abutments and their housings; second, to avoid the employment of separate inlet and exhaust valves upon opposite sides of the central steam space such as has been commonly employed heretofore in this form of engine; third, to promote economy in matter of the motive fluid employed by varying the period of admission thereof; fourth, to vary the period of admission of the motive fluid automatically in accordance with the load upon the engine; and lastly, to improve and simplify, generally, the construction of the engine as a whole, to provide for ready access to the various work- ing parts, and to reduce leakage losses around the piston.

In order that my invention may be fully understood, I will now proceed to describe an embodiment thereof, having reference to the accompanying drawings illustrating the same, and will then point out the novel features in claims.

In the drawings:—Figure 1 is a view in central vertical longitudinal section through a rotary engine constituting an embodiment of my invention, the controlling mechanism for the inlet valve being shown, in this instance, as hand operated. Fig. 2 is a top view with certain parts broken away and other parts shown in section. Fig. 3 is a detail detached view of the form of valve and rider employed in an embodiment of my invention shown in Figs. 1 and 2. Fig. 4 is a view in end elevation of the engine with the cover plate for the valve chest removed, certain portions of the valve mechanism being broken away, and other parts shown in section. Fig. 5 is a similar view in end elevation with the cover plate removed, the engine in this instance being shown as provided with an automatic governor for operating the inlet valve controlling means, in place of the hand operated means shown in the other figures. Fig. 6 is a detail detached view of certain parts illustrating the said governor and its connections in side elevation. Figs. 7 and 8 are detail detached views in front elevation of the valve, its rider, and the valve seat, showing parts in different relative positions. Fig. 9 is a view in end elevation of the engine with the valve chest and valve mechanism removed, and with the piston, the crank shaft, and the abutments, shown in transverse section, a portion of the piston and one of the abutments being further broken away in order to illustrate other parts to the rear thereof. Fig. 10 is a detail detached view in central longitudinal section through a portion of the piston, showing also a portion of one of the abutments in connection therewith. Fig. 11 is a detail detached view in rear elevation of the valve employed. Fig. 12 is a detail diagrammatic view showing the application of an automatic governor to the style of valve governing device shown in Figs. 1, 2, 3 and 4.

In general this engine comprises a cylinder or casing 20 provided with end heads 21—22 and inclosing a cylindrical chamber or steam space 23; a crank shaft 24 mounted in bearings 25 in the said end heads and having its crank portion 26 contained within the chamber 23; a cylindrical piston 27 freely mounted upon the crank portion of the shaft 24 and arranged in rolling contact with the inner peripheral wall of the cylinder; sliding abutments 28 which divide chamber 23 into a plurality of separate steam spaces; and suitable valve mechanism for controlling the admission of motive fluid to and from the several steam spaces.

The piston 27 may conveniently be formed as a single integral structure, and in order to facilitate the mounting of it in position, the crank shaft may be formed in two separate parts suitably connected together through the crank portion 26. Roller bearings may be provided between the crank pin 26 and the said piston in order to permit it to rotate freely and to save wear between the parts. The piston is conveniently provided with packing rings 29 which are disposed in grooves in the side of the said piston, the said piston being provided with ports or passages 30 which admit steam from within the chamber 23 to the grooves at the rear of the packing rings 29 so as to normally force the said packing rings outwardly, and in addition, spiral or other springs 31 may be employed if desired. This construction forms a convenient packing for preventing steam from leaking from the steam space 23 between the ends of the piston and the inner faces of the end heads. The sliding abutments 28 are mounted to reciprocate radially backwards or forwards into chambers or recesses 32, the side edges of the abutments being disposed in suitable radial grooves 33 in the end heads 21—22. At their end heads, the said abutments are provided with arms 34 which project over the periphery of the piston 27 and these arms are provided with anti-friction rollers 36 which engage upon one side with the inner walls 37 of the cylindrical recess formed in each side of the piston, and upon the other side with the outer periphery of disks 38 with which the crank shaft 24 is provided, one upon each side of the crank pin 26. These disks 38 are also received within the said cylindrical recesses in the piston but are of a diameter less than the diameter of the walls 37, thereby leaving annual grooves for the reception of the said anti-friction rollers 36.

In the revolution of the crank shaft 24, the piston will be caused to have an orbital or planetary movement within the cylinder, the axis thereof following a circular line drawn with the axis of the crank shaft as a center and the distance between the axis and the crank shaft and the axis of the crank pin as a radius. But in addition to this orbital or planetary movement, the said piston will also receive a rotational movement about its own axis produced by the rolling contact of its periphery with the inner periphery of the cylinder. The direction of this rotational movement will be opposite to the rotational movement of the crank shaft, whereby said inner walls 37 of the piston will have a rotational movement in a direction opposite to the direction of rotational movement of the periphery of the disks 38. True rolling contact will then be the result between the antifriction roller 36 and the two surfaces engaging them whereby friction will be practically eliminated at this point. The piston by means of this engagement with the abutments, will readily move the same backwards and forwards as the crank shaft revolves, their movements being such as are required in the operation of the engine. Each of the steam spaces into which the chamber 23 is divided by the said abutments 28 is provided with an inlet port 40 and exhaust port 41, and the said inlet and the exhaust ports connect with the suitable passages which lead to inlet ports 42 and exhaust ports 43 arranged in the valve seat 44. This valve seat is disposed upon the outside of the cylinder head 22 and within a chamber 45 inclosed within a valve chest comprising a casing 46 and a head 47. This valve seat 44 is of disk like form and has one port 42 for each said cylinder inlet port 40, and one said exhaust port 43 for each said cylinder exhaust port 41, each of the said sets of ports being arranged equidistantly around the said valve seat 44. Mounted upon the crank shaft 24, within the valve chamber 45, and with its face in engagement with the valve seat 44 is a valve 48. This valve is secured fast to the main shaft 24 but is provided with a projecting hub 49 which has a bearing upon a boss 50 which projects inwardly from the said valve casing head 47 (see Fig. 1). The valve 48 has inlet ports 51 which are adapted to register, in the rotation of the said valve, with the inlet ports 42 in the valve seat 44, and also has an exhaust port or opening 52 which is similarly arranged to come into register successively with the exhaust ports 43 of the said valve seat. The valve 48 is shown as provided with a number of the said inlet ports 51, such ports conveniently arranged around an arc of about 120 degrees of the said valve, whereby steam or other motive fluid may be admitted to the said steam space throughout the entire movement of the piston through each such individual steam space. In other words as there are three steam spaces in the particular engine herein illustrated, such steam spaces will represent 120 degrees of the revolution of the engine and the valve is designed so as to admit steam throughout the entire 120 degrees. The said openings, however, have blank spaces between them so that they may be conveniently controlled. On the other hand, the exhaust port or opening 52 may be, and preferably is, a continuous opening, extending for not less than 120 degrees, and not more than 240.

For the purpose of controlling the inlet openings 51 of the valve, I have provided the said valve with a rider 53, said rider comprising a disk-like portion which engages the rear face of the disk portion of the valve 48 and a hub portion 54 which is mounted upon the hub 49 of the said valve. This rider is provided with a number of openings 55 also disposed throughout substantially 120 degrees thereof, the said openings being so disposed that in one position of the rider with respect to the valve all of the said openings will be in register with the said valve inlet ports 51. It is in this position that the parts are shown in Fig. 7 of the drawings, and this may be termed the first, or full open, position.

By rotating the rider upon the valve in the direction of the arrow shown in Fig. 7 (the valve in this instance being assumed to be held stationary), it will be seen that the various valve inlet ports will be successively cut off by the rider. The whole distance through which the rider is compelled to move in order to cut off all of the ports, is a distance of a few degrees only, being from a position shown in Fig. 7 to the position shown in Fig. 8. This distance, it will be seen, is only that required for the first opening 55 (namely, that opening which is on the extreme left) of the rider to move from a position in register with the first inlet port 51 of the valve, to a position just before coming into register with the second inlet port or opening of the said valve. The ports are shown in this position in Fig. 8 of the drawings. This is the last or the full closed position. In moving from one position to the other, it will be seen that the rider will cut off the several ports or openings 51 in the valve 48 successively, from the first to the last, so that a very small movement of the rider upon the valve will have the effect of controlling the said valve ports during the entire 120 degrees. It will, of course, be readily understood that a single port of the required length might be employed in the said valve and the rider arranged to cut off more or less of this single port or opening in its movement in relation to the valve but in thus using a plurality of openings in both the valve and the rider, disposed with respect to each other as shown, I obtain, by a very small relative movement of the parts, what would otherwise be obtained by a very much larger relative movement. If the single port of the valve were 120 degrees long, it would, of course follow that the rider would have to move through 120 degrees to completely control it. It may be noted that the particular arrangement of the ports or openings of the valve and rider with respect to each other is that in which the ports of the valve are arranged at a slightly greater distance apart than are the ports of the rider, but that the sum of such differences plus the entire width of the first port of the valve, is less than the distance between the ports or openings in the rider.

The rider 53 is mounted to rotate with the valve 48 and normally rotates therewith without any change of relative rotative position, but in order to change the position of the rider with respect to the valve, a manual operating means is provided whereby the rider may be positively set with respect to the valve and only adjusted under the will of the operator, or an automatic governing means by which the rider may be actually adjusted in the running of the engine according to variations of load, may be employed, if preferred. The manual operating means is illustrated in Figs. 1, 2 3 and 4 of the drawings, and comprises a traveling ring 56 mounted upon the hub 54 of the rider and adapted to partake of the rotational movements of the said valve and rider, and another ring 57 mounted outside of the said ring 56, the said ring 57 being held stationary so far as any rotational movement is concerned. The said ring 57 is secured by means of rods 58 to a crosshead 59, the said rods 58 passing through suitable openings in the valve casing head 47, such openings being provided with packing boxes 60 to prevent escape of steam. The ring 56 is provided with anti-friction rollers 61 which are received within an internal annular groove 62 in the ring 57. The ring 56 is thereby free to move rotationally with respect to the ring 57, but upon movements being given to the ring 57 longitudinally with respect to the axis of the engine, such longitudinal movements will be thereby imparted to the said ring 56. The said ring 56 is also provided with inwardly projecting studs which carry anti-friction rollers 63. These anti-friction rollers are received within divergent cam grooves 64—65 with which the hubs 54 and 49 of the rider 53 and valve 48 are respectively provided, (see Figs. 2, 3 and 4). The effect then of imparting longitudinal movements to the rings 56 and 57 will be to cause the anti-friction roller 63 to move along the cam grooves 64 and 65 but as these cam grooves are divergent, it will follow that slight rotational movements will be thereby imparted to the rider with respect to the valve, and the ports of the valve and rider are so constructed, adjusted and designed that a complete movement of the rings will produce such a movement of the rider as to completely control the said valve ports. The required longitudinal movements are produced by manipulation of a hand wheel 66, such hand wheel in its rotation being arranged to move the crosshead 59 backwards and forwards and thus to impart such movements through the rods 58 to the ring 57.

An automatic governing device is illustrated in Figs. 5 and 6 of the drawings and comprises a centrifugal weight 68 pivoted at 69 in a projection 70 from the hub 49 of the valve 48, the said centrifugal weight having an arm 71 extending upon the opposite side of the pivotal support 69 and connected by means of a link 72 with the said rider 53. A spring 73 opposes movement of the weight 68 and a centrifugal action and a stop 74 limits the movement of such weight under such action.

By reason of the fact that the pivotal support of the weight is carried by the valve, the said weight and parts connected therewith will rotate with the valve, and the said weight will fly outward under the influence of centrifugal force, and to an extent governed by the speed of rotation of the valve, thereby producing relative movements between the rider and the valve such as will control the valve openings proportionately to the speed of the engine and hence to the load under which the engine is operating.

In Fig. 12 I have shown somewhat diagrammatically, a governor applied to the style of valve controlling device shown in Figs. 1, 2, 3 and 4. In this figure I have shown a gear wheel 84 as replacing the hand wheel 66, and have shown the said gear wheel as engaged by a rack 85 which is operated by an ordinary centrifugal governor 86. Referring again to Fig. 1, it will be seen that I have provided means for holding the valve up to its seat independently of fluid pressure, such means comprising a presser ring 75 which is mounted within the stationary hub 50, said ring arranged to bear on one side upon a flange 76 with which the valve is provided and engaged upon its opposite side by means of springs 77. The tension of the spring 77 may be adjusted by means of said screws 78 whereby the proper pressure may be applied to the valve. The ring 76 also tends to form a substantially steam tight joint which prevents leakage of motive fluid between the inlet and exhaust sides of the said valve, past the rear thereof. This ring acts further as a means for relieving the valve of a part of the steam pressure, which would otherwise be exerted to press the valve forward. The said ring is provided with spider arms whereby spaces are left to permit the free passage of exhaust motive fluid from exhaust port or opening 52 of the valve into an exhaust chamber 79 within the valve casing head 62. Thence the exhaust flows along a passage 80 (see Fig. 2) and out through a discharge pipe 81. The discharge pipe 81, as will be seen by reference to Fig. 2, connects with the valve casing 46 whereby it leaves the head 62 free for removal without necessitating the breaking of the pipe connection when said removal is effected. The inlet pipe 82 is mounted in a hub 83 which rises directly from the casing 46 and through which direct connection for live motive fluid is made to the interior of the valve casing.

What I claim is:

1. In a rotary engine the combination with a cylinder or casing, a crank shaft, and a cylindrical piston freely mounted upon the crank portion of the shaft within the cylinder, of a sliding abutment operated by the crank shaft and piston, the said abutment being provided with an anti-friction roller which is engaged upon one side by the crank shaft and upon the other by the piston.

2. In a rotary engine the combination with a cylinder or casing, a crank shaft provided with a crank, and disks upon opposite sides thereof concentric with the said crank, said crank and disks located within the cylinder or casing, of a roller piston freely mounted upon the said crank, a sliding abutment, and anti-friction rollers carried by the said abutment, the said anti-friction rollers engaged upon one side by the said disks and upon the other side by concentric walls in the said piston.

3. In a rotary engine the combination with a cylinder or casing, a shaft therefor provided with a crank and two disks concentric with the said crank, the said crank and disks located within the cylinder, of a roller piston freely mounted upon the said crank within the cylinder, and arranged in rolling contact with the inner periphery of the said cylinder, the said piston provided with circular recesses for receiving the said disks, the walls of said recesses being arranged opposite to the circumferential edges of the said disks, whereby an annular space is provided between the periphery of each disk and the wall of its recesses, and a plurality of sliding abutments disposed radially with respect to the cylinder, each said abutment having arms which extend over the edges of the piston, and anti-friction rollers carried by the said arms which enter the said annular spaces substantially as set forth.

4. In a rotary engine the combination with a cylinder or casing, a shaft provided with a crank portion arranged within the casing, a rotary piston loosely mounted upon the said crank portion within the casing, and a sliding abutment for subdividing the steam space in the cylinder, of an inlet and exhaust port for the said cylinder and a single rotary valve mounted upon the shaft to one side of the cylinder for controlling both the said inlet and the said exhaust port.

5. In rotary engine the combination with a cylinder or casing, a shaft provided with a crank portion arranged within the casing, a rotary piston loosely mounted upon the said crank portion within the casing, and a plurality of sliding abutments for subdividing the steam space within the cylinder into the plurality of chambers, of an inlet and exhaust port for each such chamber, and a single rotary valve mounted upon the shaft to one side of the cylinder for controlling the said inlet ports and the said exhaust ports.

6. In a rotary engine the combination with a cylinder or casing, a shaft provided with a crank portion arranged within the casing, a rotary piston loosely mounted upon the crank portion within the casing, and a sliding abutment for subdividing the steam space in the cylinder, of an inlet and exhaust port for the said cylinder, a single rotary valve mounted upon the shaft to one side of the cylinder for controlling both the said inlet and the said exhaust ports, the said valve including a rotary plate which determines the control for the said inlet port, and means for adjusting the position of the said rotary plate upon the valve.

7. In a rotary engine the combination with a cylinder or casing, a shaft provided with a crank portion arranged within the casing, a rotary piston loosely mounted upon the crank portion within the casing, and a sliding abutment for subdividing the steam space in the cylinder, of an inlet and exhaust port for the said cylinder, a single rotary valve mounted upon the shaft to one side of the cylinder for controlling both the said inlet and the said exhaust port, the said valve including a rotary plate which determines the control for the said inlet port, and means for adjusting the position of the said rotary plate upon the valve from the exterior of the engine.

8. In a rotary engine the combination with a cylinder or casing, a crank shaft, and a piston, of a rotary valve mounted upon the shaft to one side of the cylinder, said rotary valve containing inlet and exhaust ports, a presser plate for the said rotary valve, and means for applying a yielding pressure to force the said plate against the valve.

9. In a rotary engine the combination with a cylinder or casing, a crank shaft, and a piston, of a valve casing located on one side of the said cylinder, a rotary valve mounted upon the shaft within the said valve casing, said valve having inlet and exhaust passages therein, a presser plate engaging the valve at the rear thereof at a point between the said inlet and exhaust passages, and means for applying a yielding pressure to the said presser plate.

10. In a rotary engine the combination with a cylinder or casing, a crank shaft, and a piston, of a valve casing, located on one side of the said cylinder, a rotary valve mounted upon the shaft within the said valve casing, said valve having inlet and exhaust passages therein, means dividing the valve chamber into two parts including a presser ring arranged to bear against the rear of the valve at a point between the inlet and exhaust passages, means for admitting motive fluid to the valve casing at a point upon one side of the said presser plate, means for exhausting motive fluid from the casing upon the other side of said presser plate, and means for applying a yielding pressure to the presser plate to force the same toward the said valve.

11. In a rotary engine the combination with a cylinder or casing, a crank shaft, and a piston, of a valve casing secured to the cylinder upon one side thereof, a rotary valve mounted upon the crank shaft and provided with a concentric hub, the said valve casing also provided with an inwardly extending concentric hub upon which the hub of the valve is arranged to have a bearing, the said valve provided with inlet ports at a point upon one side of the said hub and with an exhaust passage upon the other side of the said hub, means for admitting motive fluid to the valve casing at a point exterior to the said hub, and means for discharging exhaust motive fluid through the interior of said hub.

12. In a rotary engine the combination with a cylinder or casing, a crank shaft, and a rotary piston thereon, of a rotary inlet valve mounted upon the shaft, said valve provided with a hub portion, a rider plate having a hub mounted upon the hub of the valve, the two said hubs provided with divergent cam slots, and means for engaging the said cam slots to produce relative movements between the valve and the rider.

13. In a rotary engine the combination with a cylinder or casing, a crank shaft, and a rotary piston thereon, of a rotary inlet valve mounted upon the shaft, said valve provided with a hub portion, a rider plate having a hub mounted upon the hub of the valve, the two said hubs provided with divergent cam slots, a ring mounted to rotate with the said rider and valve, the said ring having means engaging the said cam slots, and means for imparting longitudinal movements to the said ring, substantially as set forth.

14. In a rotary engine the combination with a cylinder or casing, a crank shaft, and a rotary piston thereon, of a rotary inlet valve mounted upon the shaft, said valve provided with a hub portion, a rider plate having a hub mounted upon the hub of the valve, the two said hubs provided with divergent cam slots, a ring mounted to rotate with the said rider and valve, the said ring having means engaging the said cam slots, another ring stationary as to rotative movement having means for engaging the said rotatable ring, and means for imparting longitudinal movements to the last said ring from a point exterior of the engine.

15. In a rotary engine, the combination with a cylinder or casing, a shaft provided with a crank portion arranged within the casing, a rotary piston loosely mounted upon the crank portion within the casing, and a sliding abutment for subdividing the steam space in the cylinder, of an inlet and exhaust port for the said cylinder, a single rotary valve mounted upon the shaft to one side of the cylinder for controlling both the said inlet and the said exhaust port, the said valve including a rotary plate which determines the control for the said inlet port, and automatic governing means for adjusting the position of the said rotary plate upon the valve.

16. In a rotary engine the combination with a cylinder or casing, a crank shaft and a piston, of a rotary inlet valve mounted upon the shaft, said rotary valve having a plurality of inlet ports disposed around the same, and a rider plate mounted upon the said valve, said rider plate provided with means for progressively closing the said inlet ports.

17. In a rotary engine the combination with a cylinder or casing, a crank shaft, and a piston, of a rotary inlet valve mounted upon the shaft, said rotary valve having a plurality of inlet ports disposed around the same, and a rider plate provided with a set of openings corresponding to the inlet ports in the valve but arranged slightly closer together.

18. In a rotary engine the combination with a cylinder or casing, a crank shaft, and a piston, of a rotary inlet valve mounted upon the shaft, said rotary valve having a plurality of inlet ports disposed around the same, and a rider plate provided with a set of openings corresponding to the inlet ports in the valve but arranged slightly closer together, the sum of the differences of such distances plus the entire width of one of the ports of the valve being less than the distance between the ports or openings in the rider.

19. In a rotary engine the combination with a cylinder or casing, and a crank shaft, of a roller piston mounted upon the crank within the cylinder, packing rings mounted in annular grooves in the sides of the piston, the said piston being provided with steam passages affording communication between the rear of the said rings and the steam space of said cylinder, and springs bearing against the said rings to force them outwardly.

HENRY W. N. COLE.

Witnesses:
J. W. CAREY,
EDNA FYFE.